United States Patent [19]

Hoppe et al.

[11] Patent Number: 4,764,548

[45] Date of Patent: Aug. 16, 1988

[54] TILE ADHESIVE BASED ON WATER-DILUTABLE, CELLULOSE-CONTAINING PASTES

[75] Inventors: Lutz Hoppe, Walsrode; Erhard Lühmann, Bomlitz; Frank Höhl, Neuenkirchen; Eugen Reinhardt, Walsrode, all of Fed. Rep. of Germany

[73] Assignee: Wolff Walsrode Aktiengesellschaft, Walsrode, Fed. Rep. of Germany

[21] Appl. No.: 118,369

[22] Filed: Nov. 6, 1987

Related U.S. Application Data

[63] Continuation of Ser. No. 893,127, Aug. 1, 1986, abandoned.

[30] Foreign Application Priority Data

Aug. 7, 1985 [DE]  Fed. Rep. of Germany ....... 3528266

[51] Int. Cl.$^4$ ............................ C09D 3/12; C08L 1/00
[52] U.S. Cl. ......................................... 524/31; 524/42; 524/55; 524/270; 524/425; 524/442
[58] Field of Search ...................... 524/31, 55, 42, 270, 524/425, 442

[56] References Cited

U.S. PATENT DOCUMENTS

| | | | |
|---|---|---|---|
| 2,281,483 | 4/1942 | Edgar | 524/47 |
| 3,594,338 | 7/1971 | Hoh et al. | 524/47 |
| 4,330,441 | 5/1982 | Böhmer et al. | 525/54.23 |
| 4,487,864 | 12/1984 | Bermudez et al. | 524/2 |
| 4,517,324 | 5/1985 | Lühmann et al. | 524/27 |

FOREIGN PATENT DOCUMENTS 833706  2/1952  Fed. Rep. of Germany .

OTHER PUBLICATIONS

Chemical Abstracts, Band 80, 1974, Seite 63, Zusammenfassung Nr. 16029d, Columbus, Ohio, US; & JP-A-73 68 635 (Daisei Kako Co., Ltd) 19-09-1973 Zusammenfassung.

Primary Examiner—Delbert R. Phillips
Assistant Examiner—Nathan M. Nutter
Attorney, Agent, or Firm—Sprung Horn Kramer & Woods

[57] ABSTRACT

Adhesive dispersions for tiling, based on
(1) 10-95% by weight of a water-dilutable, cellulose nitrate-containing paste with a weight ratio of solids to solvent $\geq 1$,
(2) 0.1-50% by weight of an adhesive resin dispersion or an adhesive resin which can be emulsified in $H_2O$,
(3) 0-70% by weight of a tile adhesive filler,
(4) 0-75% by weight of water,
(5) 0-10% by weight of a conventional thickener.

15 Claims, No Drawings

TILE ADHESIVE BASED ON WATER-DILUTABLE, CELLULOSE-CONTAINING PASTES

This is a continuation of application Ser. No. 893,127, filed Aug. 1, 1986, now abandoned.

The invention relates to mixtures of adhesives for ceramic tiles based on water-dilutable, cellulose nitrate-containing pastes. It is known that resin dispersions, such as polyvinyl acetate dispersions for example, can be used as adhesives for ceramic tiles. Such adhesive dispersions, however, have the significant disadvantage that they are not water-resistant and are thus unsuitable for tiling in wet rooms.

Since, however, dispersion adhesives are easier to handle than the water-resistant tile adhesives based on cement, attempts have been made to improve the dispersion adhesives in such a way that they do not have the disadvantage mentioned.

Surprisingly, this can be achieved by mixing the known adhesive dispersions for tiles with a water dilutable paste, based on cellulose nitrate, which has a weight ratio of solids-to-solvent of $\geq 1$.

The invention thus relates to adhesive dispersions for tiling, particularly in wet rooms, based on
  (1) 10–95, preferably 15–70% by weight of a water-dilutable, cellulose nitrate-containing paste with a weight ratio of solids to solvent of $\geq 1$,
  (2) 0.1 to 50, preferably 2–40, % by weight of an adhesive resin dispersion or an adhesive resin which can be emulsified in $H_2O$,
  (3) 0–70, preferably 0–65, % by weight of a tile adhesive filler,
  (4) 0–75, preferably 0–50, % by weight of water,
  (5) 0–10, preferably 0–3, % by weight of a conventional thickener,
in which the sum of (1)–(5) must always give 100% by weight.

The water-dilutable, cellulose nitrate-containing pastes are characterized in that the weight ratio of solids to solvent of these pastes is $\geq 1$.

Such water-dilutable, cellulose nitrate-containing pastes are described, for example, in DOS (German Published Specification) No. 3,139,840.

These viscous, cellulose-containing mixtures and pastes comprise preferably
  5.0–60% by weight, preferably 15–45% by weight of cellulose nitrate,
  0–55% by weight, preferably 0–35% by weight of resins,
  0.5–55% by weight, preferably 1–30% by weight of plasticizer,
  0–20% by weight, preferably 0–12.5% by weight of emulsifier,
  0–45% by weight, preferably 5–35% by weight, of at least one organic solvent,
  0–30% by weight, preferably 5–25% by weight of water,
are characterized in that 0.5–100% by weight of the plasticizer comprises at least one known alkoxylated plasticizer and the weight ratio of solids to organic solvents is greater than or equal to 1.

They are preferably diluted with water, which is added to the organic phase at temperatures of at most 45° C., preferably 40° C., in the desired amounts, preferably dropwise.

Nitrocellulose of all viscosity grades or plasticized nitrocellulose, or mixtures thereof, are suitable as cellulose nitrate.

Nitrocellulose, for example the usual collodion cotton grades, i.e. cellulose nitrates with a nitrogen content of 10.2 to 12.4% by weight, is especially suitable.

The usual plasticizers, such as, for example, the esters of aliphatic monocarboxylic acids, such as cetyl acetate, glycol diacetate, stearates, ricinol acetates, of aromatic monocarboxylic acids, such as, for example, dioctyl adipate, dimethylcyclohexylmethyl adipate, dibutyl sebacate; of aromatic dicarboxylic acids, such as, for example, dibutyl phthalate, dioctyl phthalate, dicyclohexyl phthalate, of aliphatic tricarboxylic acids, such as, for example, tributyl citrate, of inorganic acids, such as, for example, tributyl phosphate, triphenyl phosphate; as well as sulphonamides, oils, such as castor oil and linseed oil, and the alkoxylation products of the compounds mentioned, such as, for example, ethoxylated castor oils and soya oils, stearates and phosphoric acid esters, can be used as plasticizers.

The ethoxylation products of plasticizers, such as, for example, ethoxylated castor oils and soya oils, are especially suitable.

If appropriate, anionic emulsifiers, for example long-chain alkylarylsulphonates, such as dodecylbenzene sulphonate or butylnaphthalenesulphonate, alkyl sulphates, such as lauryl or stearyl alcohol sulphates, sulphosuccinic acid esters, such as dioctyl disodium succinate, or non-ionogenic emulsifiers, such as octyl- or nonylphenol oxylates with a degree of oxythylation of, suitable, 4 to 14, can be used concomitantly as emulsifiers. Preferably, ethoxylated compounds are used.

All organic solvents for cellulose nitrate are suitable as solvents for preparation of the organic phase.

Acetates, such as ethyl acetate, isopropyl acetate, butyl acetate, 2-ethylhexyl acetate, methox-n-butyl acetate and butylglycolate, ketones, such as methyl isobutyl ketone, diisobutyl ketone, 2-cyclohexyl hexanone and isophorone, are preferably used.

Cellulose nitrate-containing, solvent free dispersions, as described, for example, in DOS (German Published Specification) No. 2,703,075, can, however, also be used. For the preparation of adhesives dispersion, however, these solvent free dispersions would have to be mixed with the necessary solvents, as described above.

Polymers, preferably built up from the monomers ethylene, vinyl acetate, vinyl chloride, vinyl laurate, styrene or acrylic acid ester, are suitable for the preparation of the adhesive resin dispersions used as component (2). Copolymers or terpolymers of the monomers mentioned can also be used. The aqueous dispersions preferably contain 20 to 70% by weight solids.

These adhesive resin dispersions are known. It is also possible to use the adhesive resins listed above as self-emulsifiable resins.

Mineral fillers, such as, for example, quartz powder, quartz sand or limestone powder, are preferred as suitable fillers.

Water-soluble, high-viscosity polymers, such as, for example, xanthan gum or cellulose ethers, are suitable thickeners.

EXAMPLES 1-13

(a) A water-dilutable paste was prepared by incorporating
  46.24 parts by weight of cellulose nitrate according to standard E 24, comprising 30 parts by weight of cellulose nitrate and 16.24 parts by weight of water,
into a solution of
- 3.98 parts by weight of ethoxylated castor oil with an EO=80,
- 15.90 parts by weight of dibutyl naphthalene,
- 4.54 parts by weight of diacetone alcohol,
- 14.77 parts by weight of ethylglycol acetate, and homogenizing the mixture. Thereafter
- 14.57 parts by weight of water, were mixed in dropwise with stirring. The weight ratio of solids to solvent was 2.58.

(b) Mixtures of adhesives of the composition according to Tables 1 and 2 were prepared from the paste according to (a).

TABLE 1

| Substance | A* | B | C* | D |
|---|---|---|---|---|
| Adhesive resin dispersion (see Table 2) | 50 | 25 | — | — |
| Adhesive resin (see Table 3) | — | — | 25 | 12.5 |
| Water | — | — | 25 | 12.5 |
| Cellulose nitrate-containing paste, according to a) | — | 25 | — | 25 |
| Quartz powder | 50 | 50 | 50 | 50 |
| Thickener (xanthan gum) | 0.1 | 0.1 | 0.1 | 0.1 |

*Comparison example

These adhesives were applied to Eternit plates using a serrated spatula, and stoneware tiles were embedded therein. After storing for 7 days at 21° C. and 50% relative air humidity, these plates were placed in water and the number of days determined until these tiles detached themselves from the Eternit plates.

The results listed in Tables 2 and 3 show that the combination of cellulose nitrate-containing pastes and adhesive resin dispersions or adhesive resins which can be emulsified in water demonstrates clear improvements on wet storage.

TABLE 2

| | Adhesive resin dispersion | | | | | | | |
|---|---|---|---|---|---|---|---|---|
| Example No. | 1 | 2 | 3 | 4 | 5 | 6 | 7 | 8 |
| Polymer of | Vinyl acetate/vinyl chloride/vinyl laurate (Vinnapas-Dis. 50/30 VL ®) | Ethylene/vinyl acetate/vinyl chloride (Vinnapas-Dis. CEF 10 ®) | Vinyl acetate/ethylene (Vinnapas-Dis. EP 1 ®) | Vinyl acetate maleate (Vinnapas-Dis. MV 70 H ®) | Vinyl acetate (Vinnapas-Dis. DPN 30 ®) | Vinyl acetate (Vinnapas-Dis. Z 50 ®) | Vinyl acetate/ethylene/Vinyl chloride (Vinnapas-Dis. CEZ 16 ®) | Styrene/acrylic acid ester (Vinnapas-Dis. SAF 54 ®) |
| Solids content (% by weight) | 50 | 50 | 50 | 50 | 50 | 50 | 50 | 50 |
| Density (g/cm³) | 1.07 | 1.08 | 1.05 | 1.02 | 1.08 | 1.09 | 1.09 | 1.03 |
| pH value | 4.5 | 6.0 | 4.0 | 6.5 | 5.0 | 4.0 | 4.5 | 7.0 |
| Viscosity (mPa.s) | 2,000 ± 500 | 290 ± 100 | 2,700 ± 500 | 2,000 ± 500 | 10,000 ± 3,000 | 1,300 ± 300 | 2,400 ± 500 | 9,000 ± 3,000 |
| MFT (°C.) | 0 | +5 | 0 | 0 | +4 | +16 | +4 | +12 |
| Dominant particle size (μm) | 0.5–2.0 | 0.1 | 0.5–2.0 | 0.5–2.0 | 2.0 | 0.5–2.0 | 0.7 | 0.1 |
| Number of days on water storage according to | | | | | | | | |
| Recipe A | 12 | 2 | 5 | 2 | 2 | 2 | 2 | 13 |
| Recipe B | >21 | >21 | 18 | >21 | >21 | >21 | >21 | >21 |

TABLE 3

| | Adhesive resin dispersion - emulsifiable in water | | | | |
|---|---|---|---|---|---|
| Example No. | 9 | 10 | 11 | 12 | 13 |
| Polymer of | Vinyl acetate/ethylene (Vinnapas-Dis. EMPZ 1 ®) | Vinyl acetate/ethylene (Vinnapas-Dis. RE 545 Z ®) | Vinyl acetate/ethylene (Vinnapas-Dis. RE 524 Z ®) | Vinyl acetate/vinyl laurate/vinyl versatate (Vinnapas-Dis. RI 538 Z ®) | Vinyl acetate/ethylene (Vinnapas-Dis. RE 530 Z ®) |
| Solids content (% by weight) | 99 ± 1 | 99 ± 1 | 99 ± 1 | 99 ± 1 | 99 ± 1 |
| Bulk density (g/l) | 475 ± 50 | 375 ± 50 | 400 ± 50 | 400 ± 50 | 450 ± 50 |
| Antiblocking agent content (%) | 10 ± 2 | 10 ± 1 | 10 ± 2 | 12 ± 2 | 10 ± 2 |
| MFT (°C.) | +4 | 0 | +4 | +4 | +4 |
| Dominant particle size (μm) of the prepared dispersion | 1–5 | 1–5 | 1–8 | 1–9 | 1–7 |
| Number of days on water storage according to | | | | | |
| Recipe C | 2 | 2 | 2 | 2 | 2 |
| Recipe D | >21 | >21 | >21 | >21 | >21 |

We claim:

1. In a method for tiling comprising bringing tiles in contact with a tile adhesive dispersion, wherein the improvement comprises said adhesive dispersion comprising
   (1) 10 to 95% by weight of a water-dilutable, cellulose nitrate-containing paste or mixture with a weight ratio of solids to solvent $\geq 1$,
   (2) 0.1 to 50% by weight of an adhesive resin dispersion or an adhesive resin which can be emulsified in water,
   (3) a tile adhesive filler,
   (4) 0 to 75% by weight of water, and
   (5) 0 to 10% by weight of a thickener,
in which the sum of (1) to (5) is 100% by weight, said dispersion being essentially free of cement.

2. A method according to claim 1, wherein the adhesive is based on
   (1) 15 to 70% by weight of the cellulose nitrate-containing paste or mixture,
   (2) 2 to 40% by weight of the adhesive resin dispersion or the adhesive resin which can be emulsified in water,
   (3) no more than 65% by weight of the filler,
   (4) 0 to 50% by weight of water and
   (5) 0 to 3% by weight of the thickener.

3. A method according to claim 1, wherein the mixture or paste comprises
   (a) 5.0 to 60% by weight of cellulose nitrate,
   (b) 0 to 55% by weight of one or more resins,
   (c) 0.5 to 55% by weight of a plasticizer with 0.5–100% by weight of said plasticizer comprising at least one known alkoxylated plasticizer,
   (d) 0 to 20% by weight of one or more emulsifiers,
   (e) 0 to 45% by weight of at least one organic solvent, and
   (f) 0 to 30% by weight of water,
in which the sum of (a) to (f) is 100% by weight and the weight ratio of solids to organic is $\geq 1$.

4. A method according to claim 3, in which a mixture or a paste of
   (a) 15 to 45% by weight of the cellulose nitrate,
   (b) 0 to 35% by weight of the resin(s),
   (c) 1 to 30% by weight of the plasticizer,
   (d) 0 to 12.5% by weight of the emulsifier(s),
   (e) 5 to 35% by weight of the organic solvent, and
   (f) 5 to 25% by weight of water,
is used as the component (1).

5. A method according to claim 3 in which component (a) comprises cellulose nitrate with a nitrogen content of 10.2 to 12.4% by weight.

6. A method according to claim 3 in which component (c) comprises an ethoxylated caster oil or soya oil.

7. A method according to claim 3 in which component (d) comprises an emulsifier which is an ethoxylated compound.

8. A method according to claim 3 in which the solvent of component (e) is a member of the group consisting of ethyl acetate, isopropyl acetate, butyl acetate, 2-ethylhexyl acetate, methoxy-n-butyl acetate, butylglycolate, methyl isobutyl ketone, diisobutyl ketone, 2-cyclohexyl hexanone and isophorone.

9. A method according to claim 1, in which component 2 is based on a polymer built up from ethylene, vinyl acetate, vinyl chloride, vinyl laurate, styrene or acrylic esters are used as the adhesive resin in component 2.

10. A method according to claim 1, in which quartz powder, quartz sand or limestone powder is used as component 3.

11. A method according to claim 1, in which xanthan gum or cellulose ethers are used as the thickener.

12. A method according to claim 1, wherein the filler is selected from the group consisting of quartz powder, quartz sand and limestone powder.

13. A mehtod according to claim 1, wherein the thickener is selected from the group consisting of xanthan gum and cellulose ethers.

14. A method according to claim 1, wherein the adhesive dispersion contains no more than 70% by weight of the adhesive filler.

15. A method according to claim 1, wherein the adhesive dispersion contains 50 to 70% by weight of the tile adhesive filler.

* * * * *